United States Patent [19]
Racciato

[11] 4,270,916
[45] Jun. 2, 1981

[54] DYEING COMPOSITION AND METHOD

[75] Inventor: Joseph S. Racciato, San Diego, Calif.

[73] Assignee: Merck & Co., Inc., Rahway, N.J.

[21] Appl. No.: 940,050

[22] Filed: Sep. 6, 1978

Related U.S. Application Data

[63] Continuation-in-part of Ser. No. 819,906, Jul. 28, 1977, abandoned.

[51] Int. Cl.³ .............................................. D06P 67/00
[52] U.S. Cl. ........................................... 8/527; 8/557; 8/558; 8/561; 8/654; 8/657; 8/907; 8/908
[58] Field of Search ........................ 8/91, 18 A, 62, 92, 8/91, 18 A, 62, 527, 557, 558, 561, 654, 907, 908

[56] References Cited

U.S. PATENT DOCUMENTS

| | | | |
|---|---|---|---|
| 3,933,788 | 1/1976 | Kang et al. | 8/62 |
| 3,960,832 | 6/1976 | Kang et al. | 8/62 |
| 3,994,680 | 11/1976 | Mueller et al. | 8/62 |
| 4,073,653 | 2/1978 | Lindroth et al. | 8/91 |
| 4,082,506 | 4/1978 | Koenig et al. | 8/91 |

FOREIGN PATENT DOCUMENTS 962860 7/1964 United Kingdom.

OTHER PUBLICATIONS

KelcoAlgin, 2nd Edition, 1976, p. 27.
Xanthan Gum, 2nd Edition, 1976, p. 9.

*Primary Examiner*—A. Lionel Clingman
*Attorney, Agent, or Firm*—Gabriel Lopez; Hesna J. Pfeiffer; Julian S. Levitt

[57] ABSTRACT

Cationic or certain anionic dyes are rendered compatible with normally incompatible anionic and nonanionic polymers by the addition of certain surface active agents.

5 Claims, No Drawings

DYEING COMPOSITION AND METHOD

CROSS-REFERENCE

This is a continuation-in-part application of copending U.S. Ser. No. 819,906, filed July 28, 1977, now abandoned.

BACKGROUND OF THE INVENTION

The present invention relates to printing using cationic or certain anionic dyes, and more particularly to printing using these dyes with anionic and nonionic polymers which are normally incompatible with these dyes.

Certain anionic polymers such as, for example, algin, xanthan gum, S-7 gum, and polyacrylic acid, have unique physical and rheological properties for textile printing. Because of the anionic nature of these gums, however, they are normally incompatible with cationic or certain anionic dyes, and mixtures containing these materials form precipitates or gels and cannot be used in textile printing. Certain anionic dyes also cause gelation with nearly all commonly used thickeners including guar, hydroxyethyl cellulose (HEC), carboxymethyl cellulose (CMC), hydroxyalkyl guars, etc. This shortcoming has prevented the printer from taking full advantage of the properties imparted by these gums and of these dyes.

OBJECTS OF THE INVENTION

It is, accordingly, an object of the present invention to provide a method for making cationic or certain anionic dyes compatible with normally incompatible anionic and nonionic polymers. Another object is to prevent the formation of a precipitate or gel in compositions containing a cationic or certain anionic dye and polymer normally incompatible therewith. A further object is to provide stable compositions containing cationic dyes or certain anionic and anionic polymers normally incompatible therewith. Another object is to provide methods for dyeing textiles with compositions containing cationic or certain anionic dyes and anionic polymers normally incompatible therewith. These and other objects of the present invention will be apparent from the following description.

SUMMARY OF THE INVENTION

Cationic or certain anionic dyes are rendered compatible with normally incompatible anionic polymers by the addition of nonionic, amphoteric, or anionic surface active agents (surfactants) other than naphthalene sulfonate condensates. The surfactant is present in an amount of from about 10 weight % to about 1,000 weight % based on weight of dye.

DETAILED DESCRIPTION

It has now been found that aqueous mixtures containing cationic dyes or certain anionics and some polymers that are normally incompatible with each other are rendered compatible by the presence of certain surfactants. A cationic dye is one which forms a cation in solution. Some anionic polymers are incompatible with cationic dyes. A few anionic dyes also cause gelation with most polymers. Examples of such polymers are algin, xanthan gum, S-7 gum (described in U.S. Pat. No. 3,960,832), polyacrylic acid or polymethacrylic acid. An example of an anionic polymer compatible with a cationic dye is S-10 gum (described in U.S. Pat. No. 3,933,788). An example of an anionic dye which causes gelation with most polymers is acid Red 151 and examples of polymers with which it causes gelation are algin, xanthan gum, S-7 gum, S-10 gum, guar gum, starch, HEC, polyacrylic acid, polymethylacrylic acid, CMC and locust bean gum (LBG).

It has been found that any nonionic or amphoteric surfactant will render compatible a cationic or certain anionic dyes, and a polymer normally incompatible therewith. It has also been found that anionic surfactants other than naphthalene sulfonate condensates will render compatible a cationic dye and an anionic polymer normally incompatible therewith.

Among the various types of nonionic detergents there may be mentioned:

1. Condensation products of ethylene oxide with fatty acids, e.g.:
   Tween 61—condensation product of ethylene oxide with sorbitan monostearate,
   Tween 65—condensation product of ethylene oxide with sorbitan tristearate,
   Myrj 45—condensation product of ethylene oxide with stearic acid;

2. Condensation products of ethylene oxide with fatty alcohols, e.g.:
   Emulphogene BC 720—tridecyloxypoly(ethyleneoxy)-ethanol,
   Tergitol TMN—nonyl polyethylene glycol ether (1 mole trimethyl nonanol condensed with 6 moles ethylene oxide);

3. Condensation products of ethylene oxide with fatty amines or fatty amides, e.g.:
   Armour RD 1023—

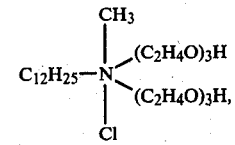

Chromasist SPN-5—ethoxylated tallow amine;

4. Condensation products of ethylene oxide with phenolic compounds e.g.:
   Emulsifier WA—aryl polyglycol ester,
   Igepal CO-990—nonyl phenoxy poly(ethyleneoxy)ethanol,
   Hyonic PE-90—alkyl phenoxy polyoxyethylene ethanol.

Other proprietary nonionic surfactants whose composition is not known are Alkanol ACN and Alkanol CD (DuPont), and Lyogen VU and Lyogen V (Sandoz).

Among the various amphoteric detergents there may be mentioned condensation products of fatty acids and amino alcohols such as diethanolamine, e.g., Alkanol CNR, Alrosol C, and Nopco 1219A.

Among the various anionic surfactants there may be mentioned:

1. Aliphatic fatty condensate with ethyleneoxide—Uniperol W,
2. Sodium salt of oleyl sarcoside—Medialan A,
3. Condensation product of fatty acids and proteins—Sulfanole R.

A more complete listing of various nonionic, amphoteric and anionic detergents may be found in Sisley and Wood, "Encyclopedia of Surface Active Agents", Vol.

II, Chemical Publishing Co., New York, 1964, and in McCutcheon's "Detergents and Emulsifiers", 1972. The disclosures of these publications are hereby incorporated by reference.

The following examples illustrate the present invention without, however, limiting the same thereto.

EXAMPLE 1

Basic red 23, 1 g, is formed into a smooth paste by mixing with 1 g of glacial acetic acid. Chromasist SPN-5, 1 g, (Nopco Div., Diamond Shamrock Co.) is added to the paste with mixing until homogenous. The homogeneous paste is diluted with 18 g of hot (160° F.) water. The resulting aqueous mixture is added to 79 ml of a solution containing 1.2 weight % xanthan gum and 1 weight % salt. The pH is adjusted to ≦4.0–4.5 with acetic acid, and the mixture used to print acrylic fabric.

When the foregoing procedure is repeated except omitting the Chromasist SPN-5, a precipitate forms and the resulting composition is unusable for printing.

EXAMPLE 2

Basic blue 60, 1 g, is formed into a smooth paste with 2 g of hot (160° F.) water. Emulphogene BC 720, 2 g, is added to the paste with mixing until homogeneous. The homogeneous paste is then diluted with 15 ml of hot (160° F.) water, and added to 80 ml, of a 1.5 weight % sodium alginate solution containing 2 g of KCl. The solution is mixed and the pH adjusted to 5.0–5.5, and the mixture used to print plush acrylic pile.

When the foregoing procedure is repeated except omitting the Emulphogene BC 720, a precipitate is formed and the resulting composition is unusable for printing.

EXAMPLE 3

Basic orange 22, 0.5 g, is formed into a smooth paste by mixing with 2.0 g of Miranol 2MCA having the following formula:

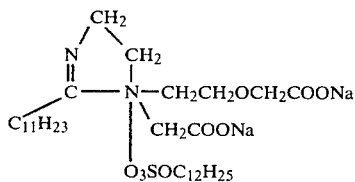

The paste is diluted with 20 ml of hot (160° F.) water and the resulting mixture added to 80 ml of a 0.35 weight % solution of S-7 gum containing 2 weight % salt and 0.1 g non-silicone anti-foaming agent. The pH is adjusted to pH 5.0–6.5 with 0.1 g $NaH_2PO_4$ and glacial acetic acid. This solution is used on a TAK unit for random dyeing of basic dyeable nylon yarn.

When the foregoing procedure is repeated except omitting the Miranol 2MCA, a precipitate is formed and the resulting composition is unusable for printing.

EXAMPLE 4

Basic red 18, 0.43 g, is formed into a smooth paste with 1 g of triethanolamine lauryl sulfate. The paste is diluted with 15 ml hot (160° F.) water and the resulting mixture added to 50 ml of 0.5 weight % xanthan gum solution containing 2 g salt. The resulting mixture is adjusted to pH 4.0–5.0 with glacial acetic acid and used to print acrylic fabric.

When the foregoing procedure is repeated except omitting triethanolamine lauryl sulfate, a precipitate is formed and the resulting composition is unusable for printing.

EXAMPLE 5

Basic red 75, 0.75 g, is formed into a smooth paste with 2.3 g of triethanolamine lauryl sulfate and mixed until homogeneous. The resulting mixture is added to a solution of 1.2 weight % sodium alginate containing 1.5 weight % Calgon and 2 weight % salt. The pH is adjusted to 4.5–5.0 with acetic acid. This is used to print basic dyeable polyester fabric.

When the foregoing procedure is repeated except omitting the triethanolamine lauryl sulfate, a precipitate is formed and the resulting composition is unusable for printing.

EXAMPLE 6

Basic blue 60, 0.1 g, 0.5 g orange 22, and 1.5 g of Tergitol 15-S-7 having the following formula:

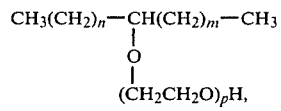

where n and m are from 11 to 15 and p is 7, are mixed to form a smooth paste. Glacial acetic acid (0.5 g) is added to the paste and mixed until homogeneous. The paste is diluted with 10 ml of hot (160° F.) water and added to 85 ml of a 0.8 weight % solution of xanthan gum containing 2 g of salt. The pH of the resulting solution is lowered to 4.0–4.5 with glacial acetic acid and used to print acrylic yarn.

When the foregoing procedure is repeated except omitting the Tergitol 15-S-7, a precipitate is formed and the resulting composition is unusable for printing.

EXAMPLE 7

CI Acid Red 151 5 g is formed into a smooth paste with 5 g of aerosol 18, an anionic surfactant, disodium N-dioctadecyl sulfosuccinamate (Amer. Cyanamid). This is then diluted with hot water (65°–95° C.) 10% dye concentration. The resulting solution is added to approximately a 1.5% solution of guar gum containing 0.5% monosodium phosphate and sufficient formic acid to lower the pH to 3.5 to 4.0.

When the foregoing procedure is repeated except omitting the Aerosol 18 high viscosity gel forms making it extremely difficult to use for printing.

What is claimed is:

1. A dyeing or printing aqueous composition comprising (a) an anionic polymer which is algin, xanthan gum, S-7 heteropolysaccharide gum, polyacrylic acid, or polymethacrylic acid; (b) a cationic dye which normally causes gelation or precipitation when mixed with said anionic polymer; and (c) a nonionic surfactant, an amphoteric surfactant, or an anionic surfactant other than napthalene sulfonate condensates.

2. A composition of claim 1 wherein the surfactant is present in an amount of from about 50 weight percent to about 500 weight percent based on the weight of the dye.

3. A method of preventing precipitation or gelation in an aqueous composition of (a) an anionic polymer which is algin, xanthan gum, S-7 heteropolysaccharide gum, polyacrylic acid, or polymethacrylic acid; and (b) a cationic dye which normally causes gelation or precipitation when mixed with said anionic polymer, comprising incorporating in the aqueous composition a nonionic surfactant, an amphoteric surfactant, or an anionic surfactant other than napthalene sulfonate condensates.

4. A method of claim 3 wherein the surfactant is present in an amount of from 50 weight percent to about 500 weight percent based on the weight of the dye.

5. A method of preparing an aqueous composition comprising (a) an anionic polymer which is algin, xanthan gum, S-7 heteropolysaccharide gum, polyacrylic acid, or polymethacrylic acid; and (b) a cationic dye which normally causes gelation or precipitation when mixed with said anionic polymer, which comprises mixing said cationic dye with a nonionic surfactant, an amphoteric surfactant, or an anionic surfactant other than naphthalene sulfonate condensates and then adding thereto said anionic polymer.

* * * * *